(No Model.)
F. J. MORGAN.
FRYING PAN.
No. 366,860. Patented July 19, 1887.
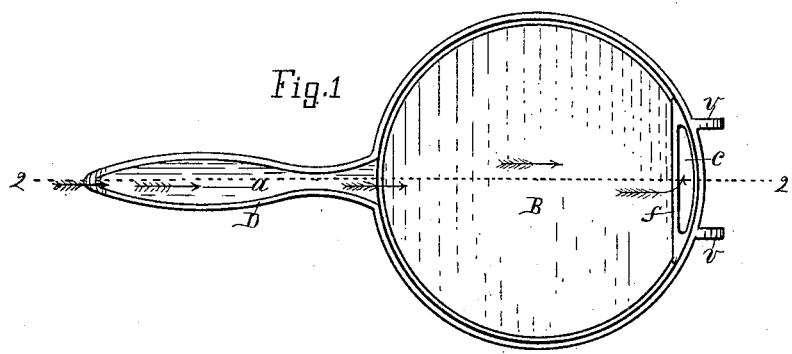
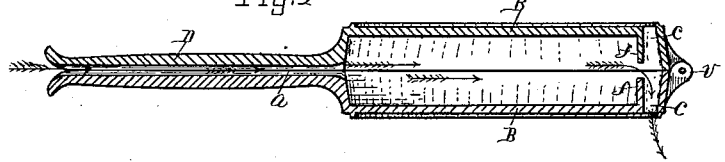
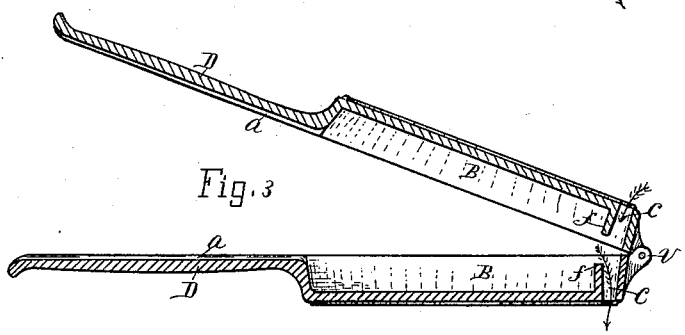
Witnesses.
John C. Perkins
Joseph E. Kellogg
Inventor.
Frank J. Morgan
By Lucius E. West
atty.

UNITED STATES PATENT OFFICE.

FRANK. J. MORGAN, OF KALAMAZOO, MICHIGAN.

FRYING-PAN.

SPECIFICATION forming part of Letters Patent No. 366,860, dated July 19, 1887.

Application filed August 14, 1886. Serial No. 210,873. (No model.)

*To all whom it may concern:*

Be it known that I, FRANK. J. MORGAN, a citizen of the United States, residing at Kalamazoo, county of Kalamazoo, State of Michigan, have invented a new and useful Frying-Pan, of which the following is a specification.

This invention consists in the peculiar construction of a cooking-dish to prevent the smoke and fumes from the food being cooked escaping into the room.

In the drawings forming a part of this specification, Figure 1 is a plan of the lower pan in Figs. 2 and 3, two pans being hinged together in the two latter-named figures; Fig. 2, a section on line 2 2 in Fig. 1, showing one pan covering the other; Fig. 3, same with upper pan partly raised.

Referring to the letters of reference on the drawings, B B are two pans, one turned top downward on the other, in such a manner that the upper pan forms a cover to the lower. They are hinged together at $v$. The handles D are channeled lengthwise, as at $a$, so that when the upper pan fits on the other, as in Fig. 2, a draft-passage is formed through the handle into the pan. At one side of the pan's back side, as herein shown, is a wall, $f$, and between this wall and the inclosure of the spider an opening or escape-passage, $c$, leads down through the pan-bottom. Thus when the pans are closed, the passage $c$ of the upper pan registers with the passage $c$ of the lower pan. The object of the wall $f$ is to prevent the gravy or grease from running through the passage $c$ into the fire, and also to prevent said passage from being covered by the meat, or whatever food is being cooked. In this use one pan serves as a hinged cover to the other, and they may be reversed, bringing the lower pan to the top, and vice versa, the upper spider. Such action would serve to turn the meat. They are sometimes used to bake griddle-cakes, and by turning the pans over the cakes would be turned.

When in use the draft is through the handle, down through the passage $c$ of the upper spider, and out into the fire through the passage $c$ in the lower pan, whence the fumes go up the draft-pipe of the stove. (See the arrows in the different figures.) When desiring to examine the interior of the pans, the upper one is swung upon its hinge $v$, Fig. 3.

Having thus described my invention, what I claim as new, and desire to secure by Letters Patent, is—

The combination of two frying-pans hinged together, one inverted upon the other, said pans having an air-passage leading through the handle into the interior of the pan, and each pan having a fume-passage leading through the bottom, substantially as set forth.

In testimony of the foregoing I have hereunto subscribed my name in presence of two witnesses.

FRANK. J. MORGAN.

Witnesses:
JOSEPH E. KELLOGG,
CHARLES C. JENNINGS.